United States Patent [19]
Stoffel et al.

[11] Patent Number: 4,468,704
[45] Date of Patent: Aug. 28, 1984

[54] ADAPTIVE THRESHOLDER

[75] Inventors: James C. Stoffel, Rochester, N.Y.; To R. Hsing, Sudbury, Mass.; Jagdish C. Tandon, Fairport, N.Y.

[73] Assignee: Xerox Corporation, Stamford, Conn.

[21] Appl. No.: 437,974

[22] Filed: Oct. 28, 1982

[51] Int. Cl.³ .............................................. H04N 1/40
[52] U.S. Cl. ..................................... 358/282; 382/52; 382/53
[58] Field of Search ................. 358/282, 166; 382/52, 382/53

[56] References Cited
U.S. PATENT DOCUMENTS 3,599,148  8/1971  Stern ....................................... 382/53
3,675,201  7/1972  McKissick et al. .................... 382/53
4,345,314  8/1982  Melamud ............................. 358/282

OTHER PUBLICATIONS
IBM Tech. Dis. Bull. vol. 18, No. 6, Nov. 1975, pp. 1962–1965.

Primary Examiner—Howard W. Britton
Attorney, Agent, or Firm—Frederick E. McMullen

[57] ABSTRACT

An adaptive thresholder of the fractional average context type for processing image pixels in which an offset potential, which is used in conjunction with the image potentials of the nearest neighbor pixels to provide an updated threshold potential, is obtained on a pixel by pixel basis as a function of the pixel white peak and black valley potentials. The white peak and black valley potentials are compared with the image potential of each pixel being processed and with predetermined minimum white and maximum black potentials to provide updated white peak and black valley potentials for use in updating the offset potential during processing of each pixel.

10 Claims, 7 Drawing Figures

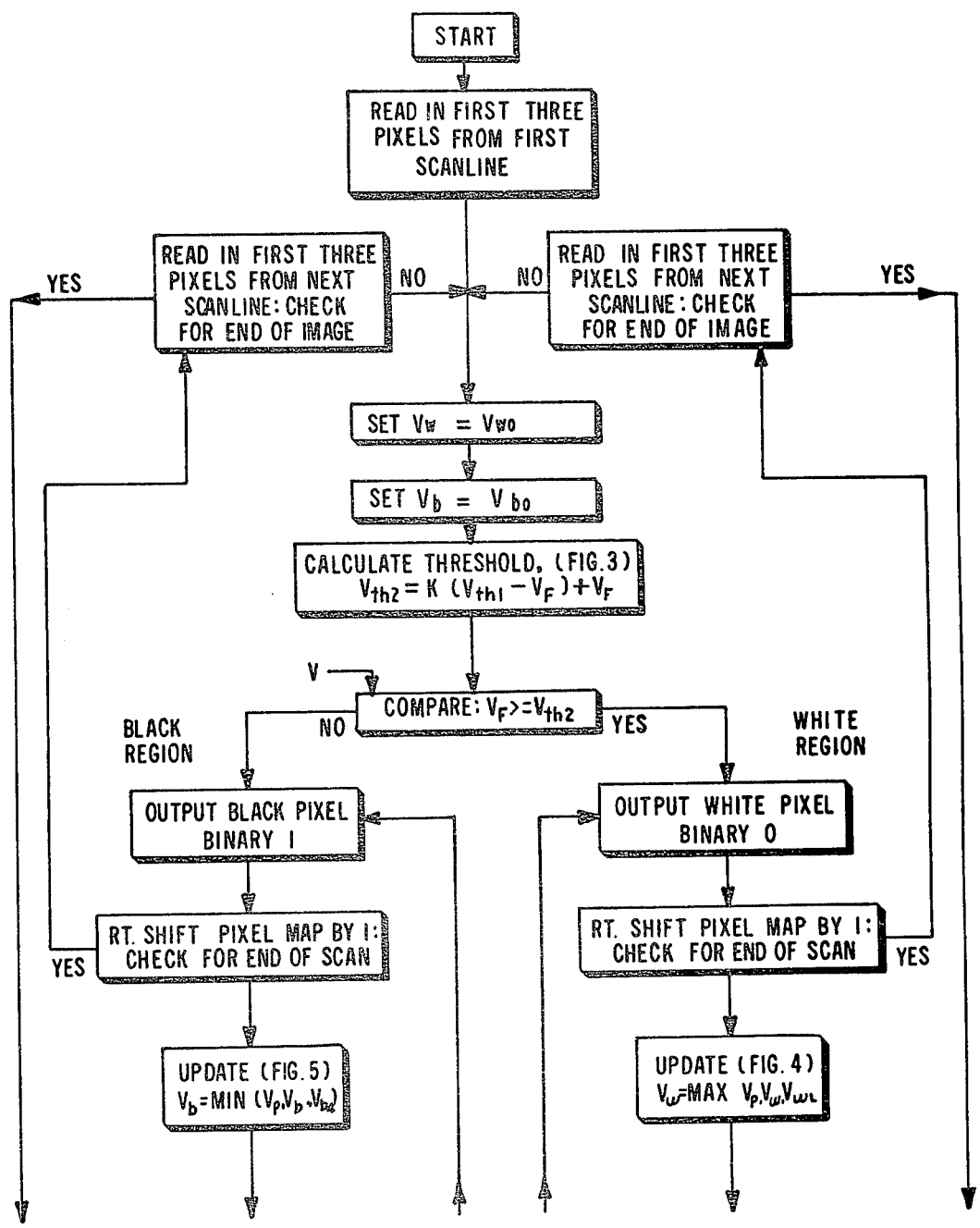

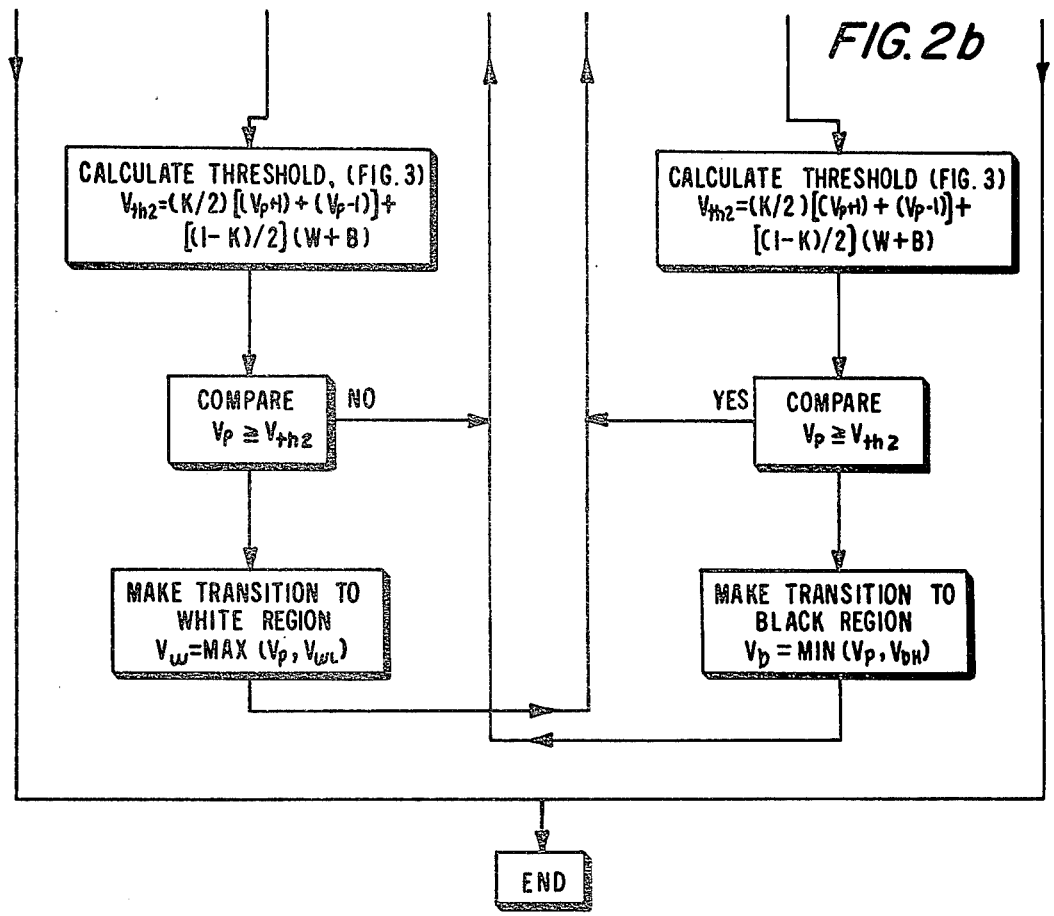

4,468,704

ADAPTIVE THRESHOLDER

The invention relates to an image pixel thresholder, and more particularly to an adaptive thresholder for thresholding image pixels.

Image signals or pixels are typically derived by raster scanning an image original line by line with a suitable image reading device which may for example comprise a CCD array. For this purpose, the image original may be illuminated and viewed a line at a time by the array which in effect converts the gray level of the image areas viewed to a voltage representation. The voltage representations of the individual reading elements that comprise the array are thereafter multiplexed or transferred to one or more on board parallel input to serial output shift registers and then clocked from the shift register or registers as a serial stream of image pixels.

The image pixel output of the array, or in some cases plural arrays, is analog in form and is supplied to a suitable user as for example a printer or where immediate copies of the image original are not desired, to a suitable image storage device or memory. In some applications, the ultimate user may be at a remote location in which case the image pixels are transported over a suitable communication channel to the user.

At some point prior to printing copies, the analog image pixels are normally converted to digital and typically this is accomplished by thresholding or screening the image pixels. In pixel processing of this type, the image pixels are compared, that is, thresholded, against a preselected signal potential or threshold, and where the image pixel being processed exceeds the threshold potential, an image pixel signal of one level is output. On the other hand, where the image pixel is below the threshold potential, an image pixel signal of a different level is output.

Obviously, the potential that is selected for thresholding plays a significant and even critical part in the efficiency and accuracy of the thresholding process and the later ability to create a faithful reproduction or copy of the image original.

The invention relates to an adaptive thresholder for processing image pixels using a threshold potential which is updated continuously on a pixel by pixel basis in accordance with changes in image content comprising in combination: first comparator means for comparing the potential of the pixel being processed with the previous maximum white potential and resetting the maximum white potential to the potential of the pixel being processed when the potential of the pixel being processed is greater than the maximum white potential; second comparator means for comparing the potential of the pixel being processed with the previous minimum black potential and resetting the minimum black potential to the potential of the pixel being processed when the potential of the pixel being processed is less than the minimum black potential; averaging means for averaging the maximum white and minimum black potentials; multiplier means for multiplying the output of the averaging means by a preset factor to provide an updated offset potential; adder means for summing the offset potential output by the multiplier means with the potential of at least one neighboring pixel to provide a threshold potential; and means for thresholding the pixel being processed with the threshold potential obtained.

The invention further relates to the method of reducing the effect of noise on a video image signal thresholder of the type employing an offset parameter by adapting the offset parameter to changes in image content, including the steps of: providing peak white and black video signals for use with the offset parameter; updating the white signal on each black to white image transition; updating the black signal on each white to black image transition; summing updated white and black signals together; and multiplying the sum obtained by a predetermined constant to provide an updated offset parameter for use in thresholding image signals.

IN THE DRAWINGS

FIGS. 2a and 2b are a flow chart illustrating pixel processing using the adaptive thresholder of the present invention;

Figure 1:
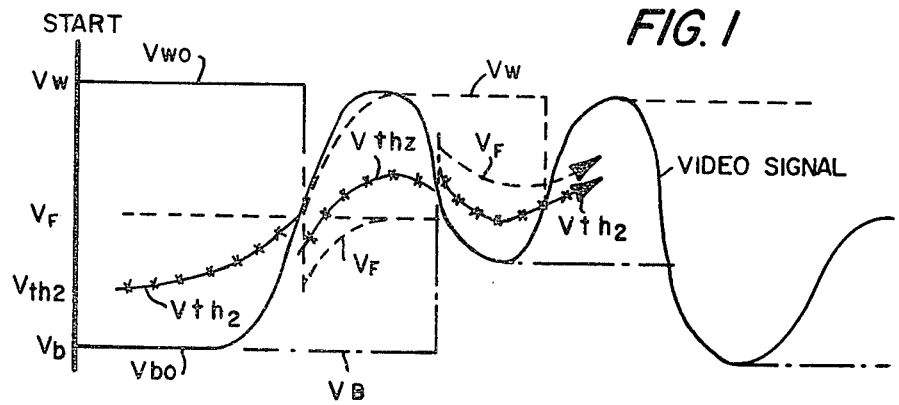
FIG. 1 is a graph plot illustrating a typical image pixel signal being processed by the adaptive thresholder of the present invention.

As used herein, the term pixel refers to a picture element which essentially comprises a signal, the voltage level of which is representative of image gray level in digital form each pixel is typically represented by 8 bit words. By way of example, a voltage level of zero may be considered as representing black while a voltage level of 255 millivolts (mv) may be considered as representing white. Voltage levels between zero and 255 mv represent different shades of gray from the darkest gray at 1 millivolt and progressing upwardly to the lightest gray at 254 millivolts.

The image pixels may be derived from any suitable source as for example a raster input scanner of the type employing one or more linear arrays, for example CCD's arranged to scan the image on a document original line by line or by using a flying spot scanner, etc. For this purpose, relative movement as by means of a document transport is established between the original being scanned and the array or arrays. The image pixel produced by the array or arrays, which due to the inherent operating characteristics of arrays of this type are in bursts of one line each, are typically processed by thresholding or screening. For thresholding, the image pixels are compared, i.e. thresholded against a preset signal or threshold level which effectively converts the analog pixel signals output by the array or arrays to binary level pixel signals. In the example given above, a threshold of 128 millivolts may be envisioned. With the use of a comparator circuit, pixels below 128 millivolts are classified as black image areas while pixels equal to or above 128 millivolts are classified as white or background image areas. Screening is similar except that multiple ones of the image pixels are compared or thresholded against a corresponding number of selected threshold levels.

To enhance the thresholding function, a threshold that changes, i.e. adapts, with changes in image content is preferable over a fixed level threshold. One preferred form of adaptive thresholder is known as a fractional average content algorithm and is given by the following equation:

$$V_{th2} = K(V_{th1} - V_F) + V_F = KV_{th1} + V_F(1-k), \quad \text{I}$$

where
  $V_{th2}$ is the adaptive threshold level;
  $V_F$ a voltage offset parameter;
  $V_{th1}$ a control threshold level; and
  K a constant.

The two parameters of the equation are K and $V_F$. $V_{th1}$ in the simplest case is the average of the two nearest neighbors of the pixel P being processed. In the presence of noise in the video input, low values of K (typically 0.4 to 0.6) have to be used to reduce the sensitivity of the equation to noise. However, this in turn limits the density range that can be handled by the equation. To enhance the adaptive capability of the equation while permitting a relatively low value of K in the presence of both image text and density variation, the offset parameter $V_F$ is made adaptive.

The offset parameter $V_F$ is decided by two quantities $V_w$ and $V_b$ according to the relationship:

$$V_F = f(V_w + V_b) \quad \text{(II)}$$

where
  $V_w$ is the white peak (maximum) pixel signal;
  $V_b$ the black valley (minimum) pixel signal; and
  f is a constant $\leq 1$. Typically f is 0.5.

Referring particularly to FIGS. 1 and 2 of the drawings, at the beginning of a scan line (START), the first three pixels (i.e. P−1, P, P+1) are read in and the values of the white and black pixel signals $V_w$ and $V_b$ are set to predetermined initial values, identified as $V_{wo}$ and $V_{bo}$ respectively herein. An initial threshold level ($V_{th2}$) is determined utilizing the relationships expressed by equations I and II and the predetermined values $V_{wo}$ and $V_{bo}$.

The first pixel (P) of the scan line is thresholded using the threshold level $V_{th2}$ obtained. Where the value of the pixel P is greater than or equal to the threshold level $V_{th2}$, the image area represented by the pixel P is determined to be white and a preset image signal (i.e. a binary "0") is output. Where the value of the pixel is less than the threshold level $V_{th2}$, the image area represented by pixel P is determined to be black and a preset image signal (i.e. a binary "1") is output. Following this, the pixel input is shifted by one (i.e. from P−1, P, P+1 to P, P+1, P+2) and the next pixel (i.e. P+1) processed.

Figure 5:
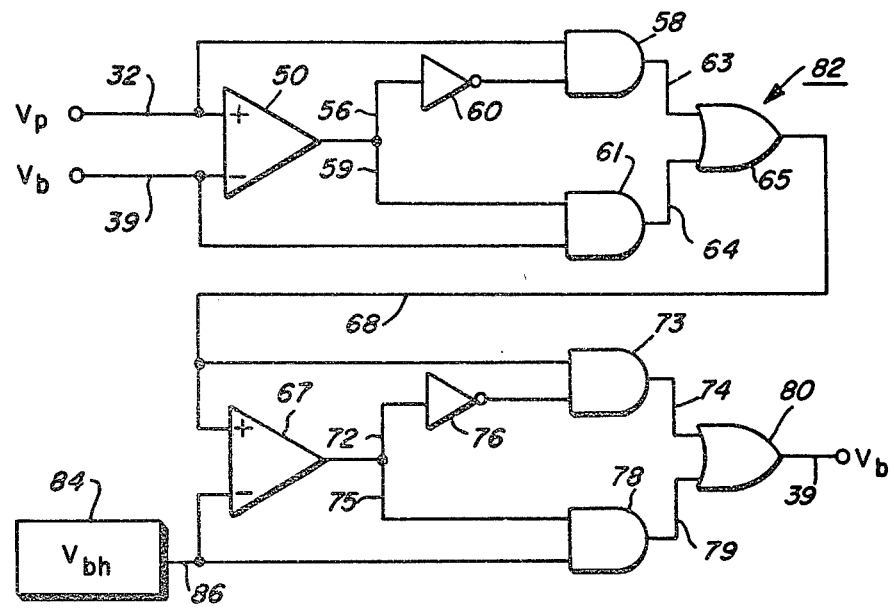
FIG. 5 is a circuit schematic of the black valley updating circuit.

Following processing of each pixel, the white peak pixel signal $V_w$ (where the pixel being processed is determined to be white) or the black valley pixel signal $V_b$ (where the pixel being processed is determined to be black) is updated (UPDATE $V_w$; UPDATE $V_b$) using white peak updating circuit 49 (FIG. 4) or black valley updating circuit 82 (FIG. 5). As will appear at each black to white transition of the pixel signal, the white peak pixel signal $V_w$ is set equal to the larger of the instantaneous pixel signal $V_p$ and $V_{wL}$. At any other time, the white peak signal $V_w$ is updated in the white region only according to the following relationship:

$$V_w = \text{Max. of } V_p, V_w, \text{ and } V_{wL};$$

where
  $V_{wL}$ is the lowest or minimum value that the white peak pixel signal $V_w$ is allowed to acquire.

Otherwise, $V_w$ remains unchanged.

At each white to black transition of the pixel signal, the black valley pixel signal $V_b$ is set equal to the smaller of the instantaneous pixel signal $V_p$ and $V_{bH}$. The black valley pixel signal $V_b$ is updated in the black region only according to the following relationship:

$$V_b = \text{Min. of } V_p, V_b, \text{ and } V_{bH};$$

where
  $V_{bH}$ is the highest value that the black valley pixel signal $V_b$ is allowed to acquire.

Otherwise, $V_b$ remains unchanged.

Following the aforedescribed updating of either the white peak or black valley pixel signals ($V_w$, $V_b$ respectively), a new threshold level $V_{th2}$ is determined in accordance with the relationship expressed by equations I and II using thresholder circuit 10 (FIG. 3) as will appear. The new threshold is then used to process the next succeeding pixel to provide, in accordance with the aforedescribed relationships, a binary level image pixel output. As a result, the threshold level ($V_{th2}$) against which the image pixels are thresholded changes or adapts in accordance with changes in image content to provide enhanced thresholding and reduced edge noise.

Figure 3:
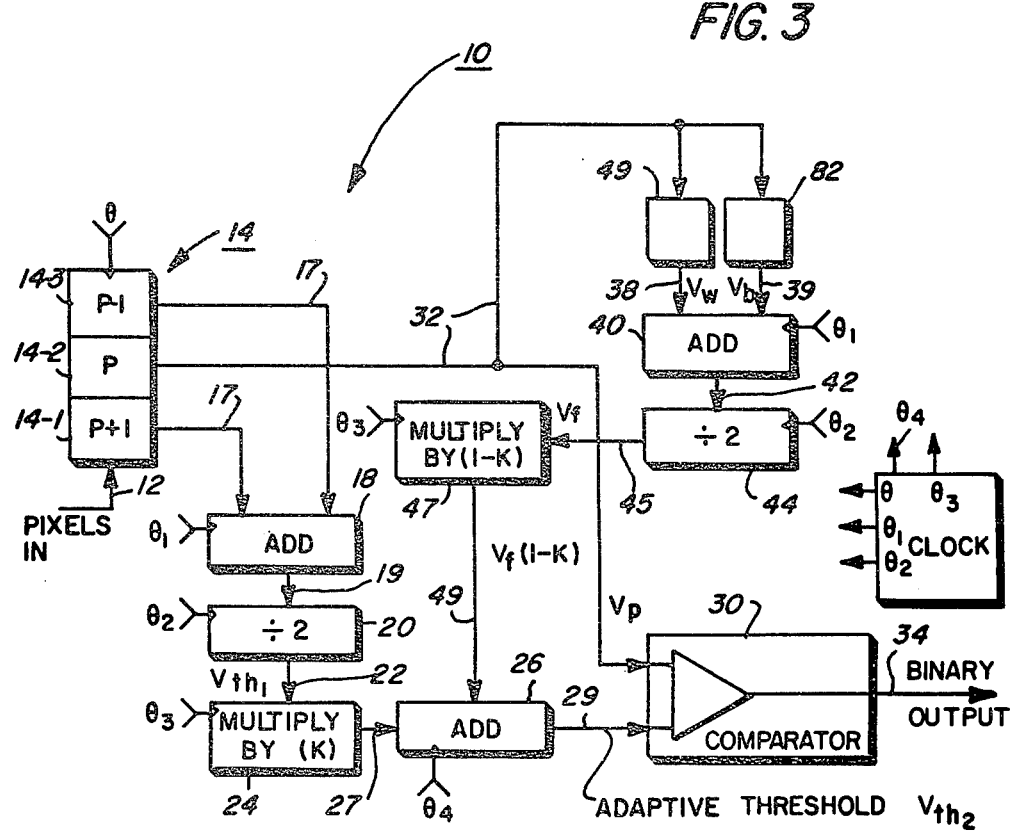
FIG. 3 is a schematic block diagram showing details of the adaptive thresholder of the present invention.

For thresholding, and referring to FIG. 3, image pixels P to be processed are input from the image pixel signal source through pixel input line 12, the pixels being input to three pixel delay buffer 14 of thresholder 10. As will be understood, buffer 14, which has three buffer stages 14-1, 14-2, 14-3, serves to establish a preset temporal relationship between neighboring pixels, here the pixel P being processed in buffer stage 14-2 and the neighboring pixels P−1 and P+1 in buffer stages 14-1 and 14-3 before and after the pixel P. Buffer 14 may comprise any suitable commercially available serial input to parallel output buffer.

To determine the threshold $V_{th2}$ in accordance with the equation I, pixels P−1 and P+1 are input to adder 18 of thresholder circuit 10 through lines 17. Adder 16, which comprises any suitable commercially available binary adder, adds or sums the pixel signals P−1 and P+1 together, the sum total being output through line 19 to a divider 20. In the exemplary arrangement shown, divider 20 is preset to average the pixel sum output by adder 18. The pixel average output by divider 20 is fed through line 22 to multiplier 24. Multiplier 24, which comprises any suitable binary multiplier, multiplies the pixel signal by the constant K. The output of multiplier 24 is fed to one input of an adder 26 through line 27.

The current white peak and black valley pixel signals $V_w$, $V_b$ respectively in output lines 38, 39 of white peak and black valley updating circuits 49, 82 respectively (shown in FIGS. 4 and 5 and to be more fully described hereinbelow) are input to an adder 40 which serves to sum the signals $V_w$, $V_b$ together. The signal output of adder 40 is passed by line 42 to divider 44 where the sum signal ($V_w + V_b$) is averaged. The averaged signal from divider 44 is fed through line 45 to multiplier 47 where the signal is multiplied by the constant 1-K to provide the offset parameter $V_F$. The output of multiplier 47 is coupled by line 49 to a second input of adder 26. Adder 26 sums the outputs of multipliers 24, 47 to provide the threshold value $V_{th2}$ which is fed by line 29 to one input of a suitable comparator 30. The other input of comparator 30 comprises the current value $V_p$ of the pixel P being processed which is input from input buffer stage 14-2 through line 32. Comparator 30 serves to compare, i.e. threshold, the image pixel value $V_p$ with the adapted threshold output $V_{th2}$ of adder 26 to provide a binary image pixel (i.e. "1" or "0") to output line 34.

Figure 4:
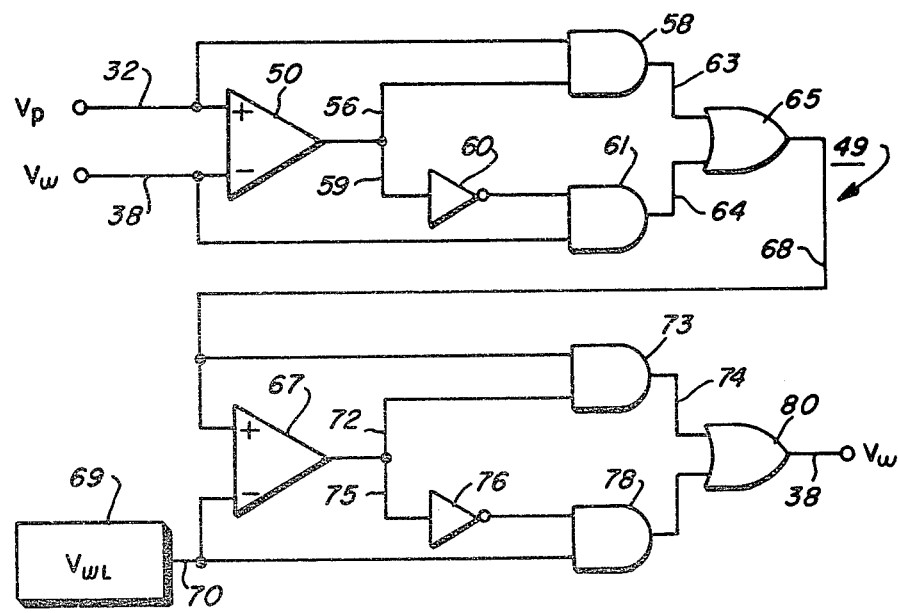
FIG. 4 is a circuit schematic of the white peak updating circuit.

Referring to FIG. 4, white peak updating circuit 49 has a comparator 50 for comparing the current pixel value $V_p$ in line 32 with the current white peak value $V_w$ in line 38. The output of comparator 50 is passed by line 56 to one input of AND function gate 58 and by line 59 and inverter 60 to one input of AND function gate 61. A second input to gate 58 comprises the current pixel value $V_p$ in line 32 while a second input to gate 61 comprises the current white pixel value $V_w$ in line 38. The outputs of gates 58, 61 are passed by lines 63, 64 to OR function gate 65. The output of gate 65, which as will be understood comprises either the current pixel value $V_p$ or the current white peak value $V_w$, is fed to one input of a comparator 67 through line 68.

A minimum white peak value $V_{w1}$ is derived from a suitable source 69 and is input to a second input of comparator 67 through line 70. The output of comparator 67 is passed by line 72 to one input of AND function gate 73 and by line 75 and inverter 76 to one input of AND function gate 78. A second input to gate 73 comprises the output of gate 65 in line 68 while a second input to gate 78 comprises the minimum white peak value $V_{w1}$ in line 70. The outputs of gates 73, 78 are fed to OR function gate 80 through lines 74, 79 respectively. The output of gate 80, which comprises the updated white peak value (identified herein as $V_w$) and which comprises either the current pixel value $V_p$, or the current white peak value $V_w$, or the minimum white peak value $V_{w1}$, is output to line 38 and one input of the adder 40 shown in FIG. 3.

The black valley updating circuit 82 shown in FIG. 5 is generally similar to the white peak updating circuit 49 discussed above and accordingly common numerals are used to refer to like parts. There, the current black valley value $V_b$ in line 39 is input to comparator 50 where the value $V_b$ is compared with the current pixel value $V_p$. The output of comparator 50 enables one of the AND function gates 58, 61 to pass either the current pixel value $V_p$ or the current black valley value $V_b$ to comparator 67. It is noted that inverter 60 in black valley updating circuit 82 is in the input line 56 to gate 58 rather than in the input line 59 to gate 61 as in white peak updating circuit 49.

A maximum black valley signal $V_{bH}$ is derived from a suitable source 84 and input through line 86 to a second input of comparator 67 and gate 78. Comparator 67 compares the output of gate 65 with the maximum black valley value $V_{bH}$, the output of comparator 67 of black valley updating circuit 82 enabling one of the gates 73, 78 to pass the updated black valley value (identified herein as $V_b$) and which comprises either the current pixel value $V_p$, or the current black valley value $V_b$, or the maximum black valley value $V_{bH}$ via OR function gate 80 to line 39 and a second input of the adder 40 shown in FIG. 3. In black valley updating circuit 82, inverter 76 is disposed in line 72 to AND function gate 73 in contrast to line 75 and AND function gate 78 of white peak updating circuit 49.

OPERATION

Figure 6:
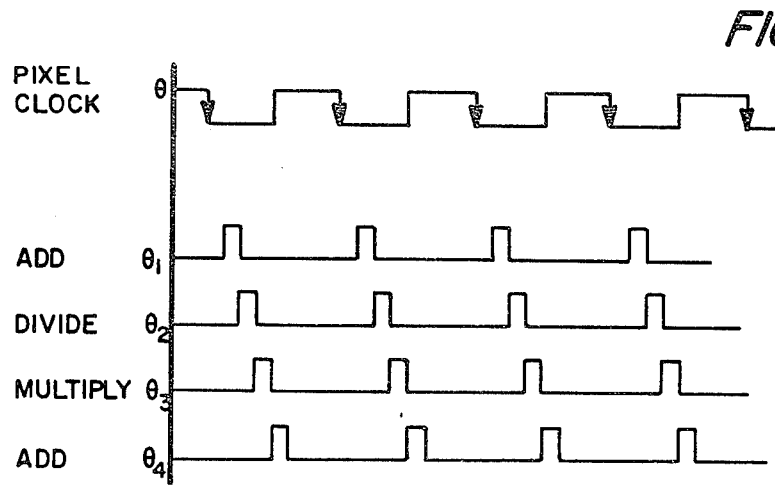
FIG. 6 is a timing chart illustrating the timing sequences of the adaptive thresholder of the present invention when processing image pixels.

Referring to FIGS. 1–5 and the timing chart of FIG. 6, the first three pixels (i.e. P−1, P, P+1) are read into buffer 14 from the first scan line (START). At this point, the white peak $V_w$ and black valley $V_b$ values used to determine the appropriate threshold $V_{th2}$ for processing the first pixel are set to preset white peak and black valley signal levels $V_{wo}$ and $V_{bo}$ respectively. White peak and black valley signal levels $V_{wo}$ and $V_{bo}$ respectively are derived from suitable signals sources (not shown).

The threshold $V_{th2}$ for processing the first pixel is then determined in accordance with equation I by circuit 10. More specifically, the white peak $V_w$ and black valley $V_b$ values are processed by adder 40, divider 44 and multiplier 47 of circuit 10 to provide one input to adder 26. Concurrently, neighboring pixels P−1 and P+1 are processed by adder 18, divider 20 and multiplier 24 to provide a second input to adder 26. Adder 26 sums the inputs thereto, the output of adder 26 comprising the updated threshold level $V_{th2}$ which is input to comparator 30 to threshold the pixel P being processed. The binary output of comparator 30 reflects the thresholded pixel value for the pixel P being processed.

The existing threshold $V_{th2}$ is updated prior to processing the next pixel (i.e. P+1) using either white peak updating circuit 49 or black valley updating circuit 82 depending on whether or not the previously processed pixel (i.e. P) was determined to lay in the white region (i.e. binary "0") or the black region (i.e. binary "1"). For example, if the previous pixel (i.e. P) was determined to lay in the white region (i.e. binary "0"), the current white peak value $V_w$ of circuit 49 is compared with the value $P_v$ of the processed pixel (P) by comparator 50 of white peak updating circuit 49. The greater of the two values (i.e. either $V_w$ or $V_p$) is then compared by comparator 67 with the minimum white peak value $V_{w1}$ derived from signal source 69 and the larger value (i.e. $V_w$ or $V_p$ or $V_{w1}$) output to line 38 as the new or updated white peak value $V_w$. On a transition from a white to black region, the $V_b$ is updated by the smaller of $V_p$ and $V_{bH}$.

A similar updating process for the black valley value $V_b$ takes place in black valley updating circuit 82 when the pixel being processing is determined to lay in the black region. It will be understood however that minimum rather than maximum values are compared by black valley updating circuit 82. On a transition from a black to white region, $V_w$ is updated by the larger of $V_p$ and $V_{wL}$.

The next pixel (i.e. P+1) is then processed in the manner described above by thresholded circuit 10 using the newly updated white peak or black valley values $V_w$, $V_b$ respectively, a new threshold level $V_{th2}$ being determined and utilized to threshold the pixel (i.e. P+1). Successive pixels that comprise the line of image data (i.e. P+2, P+3, . . . P+N) are processed in the same manner, the threshold level $V_{th2}$ being updated on a pixel by pixel basis.

While the invention has been described with reference to the structure disclosed, it is not confined to the details set forth, but is intended to cover such modifications or changes as may come within the scope of the following claims.

We claim:

1. Apparatus for adaptively thresholding the image pixels that comprise a video image signal on a pixel by pixel basis to distinguish white and black image areas in said video image signal, comprising, in combination:

(a) white image signal parameter generating means responsive to transition of the video image signal from black to white to provide a white image signal parameter equal to larger of said video image signal and a preset minimum white signal;

(b) black image signal parameter generating means responsive to transition of the video image signal from white to black to provide a black image signal parameter equal to smaller of said video image signal and a preset maximum black signal;

(c) first means for combining said white and black image signal parameters to provide an offset parameter for the pixel being processed;

(d) second means for combining said offset parameter with the video image signal of at least one neighboring pixel to provide a threshold level for thresholding said pixel being processed; and (e) thresholding means for thresholding said pixel with said threshold level.

2. The adaptive thresholding apparatus according to claim 1 in which said white and black image signal parameter generating means each include means for providing predetermined white and black image signal parameters for startup of said apparatus.

3. The adaptive thresholding apparatus according to claim 1 in which said white image signal parameter generating means includes a comparator for comparing the current white image signal parameter with said video image signal, and reset means to change said current white image signal parameter to said video image signal in the event said video image signal is less than said current white signal parameter;

said black image signal parameter generating means including a comparator for comparing the current black image signal parameter with said video image signal; and reset means to change said current black image signal parameter to said video image signal in the event said video image signal is higher than said current black image signal parameter.

4. The adaptive thresholding apparatus according to claim 3 in which said white image signal parameter generating means includes a second comparator for comparing said current white image signal parameter with a preset minimum white parameter signal; said white image signal parameter reset means including means to change said current white image signal parameter to said preset minimum white parameter when said current white parameter is less than said preset minimum white parameter;

said black image signal parameter generating means including a second comparator for comparing said current black image signal parameter with a preset maximum black parameter signal, said black image signal parameter reset means including means to change said current black image signal parameter to said reset maximum black parameter when said current black image signal parameter is more than said maximum black parameter signal.

5. A process for adaptively thresholding the image pixels comprising a video image signal to distinguish white image areas from black image areas in said video image signal, comprising the steps of:

(a) establishing a white image parameter equal to the larger of the instantaneous video image signal and a preset minimum white signal on transition of the video signal from black to white;

(b) establishing a black image parameter equal to the smaller of the instantaneous video image signal and a preset minimum black signal on transition of the video signal from white to black;

(c) combining said parameters in a predetermined relationship to provide an offset parameter for the pixel being processed;

(d) combining said offset parameter with the video image signal from at least one neighboring pixel in a predetermined relationship to provide a threshold level for use in thresholding said pixel being processed; and (e) thresholding said pixel being processed against said threshold level.

6. The process recited in claim 5 including the step of:

providing predetermined white and black image parameters at startup of said process.

7. The process according to claim 5 including the steps of:

(a) in the absence of said black to white transition, comparing the current white image parameter with said pixel being processed, and (b) resetting said white image parameter to said pixel being processed in the event said pixel being processed is less than said current white image parameter; and (c) in the absence of said white to black transition, comparing the current black image parameter with said pixel being processed, and (d) resetting said black image parameter to said pixel being processed in the event said pixel being processed is more than said current black image parameter.

8. The process according to claim 7 including the steps of:

(a) comparing said current white image parameter with a preset minimum white parameter signal, and (b) resetting said current white image parameter to said preset minimum white parameter signal when said current white parameter signal is less than said preset minimum white parameter signal; and (c) comparing said current black image parameter with a preset maximum black parameter signal, and (d) resetting said current black image parameter to said preset maximum black parameter signal when said current black image parameter signal is more than said preset maximum black parameter signal.

9. The process according to claim 5 including the step of:

averaging said white and black image parameter to provide said offset parameter.

10. The process according to claim 9 including the steps of:

(a) averaging the video signals from the pixel preceding and the pixel succeeding said pixel being processed to provide a neighborhood parameter; and (b) summing said neighborhood parameter with said offset parameter to provide said threshold level.

* * * * *